United States Patent [19]

Armstrong

[11] Patent Number: 5,289,796
[45] Date of Patent: Mar. 1, 1994

[54] BIRD FEEDER

[76] Inventor: George W. Armstrong, P.O. Box 507, Fairborn, Ohio 45324

[21] Appl. No.: 44,056
[22] Filed: Apr. 8, 1993
[51] Int. Cl.[5] ............................................. A01K 39/01
[52] U.S. Cl. ................................. 119/52.3; 119/57.9; 119/53; 119/59; 248/333
[58] Field of Search .................... 119/52.2, 52.3, 57.8, 119/57.9, 59, 53, 52.4, 63; 248/318, 320, 321, 333

[56] References Cited

U.S. PATENT DOCUMENTS

| | | | |
|---|---|---|---|
| 1,026,859 | 5/1912 | Garrison | 119/53 |
| 1,708,838 | 4/1929 | Hedrick | 119/63 |
| 1,891,042 | 12/1932 | Benoit | 119/52.2 |
| 2,344,367 | 3/1944 | Pueschel | 119/52.3 |
| 2,429,777 | 10/1947 | Smith | 119/53 |
| 2,591,126 | 4/1952 | Breck, Jr. | 119/52.2 |
| 2,866,435 | 12/1958 | Blazier | 119/53 |
| 3,301,217 | 1/1967 | Prowinsky | 119/57.9 |
| 4,289,292 | 9/1981 | Kunjumon | 248/333 |
| 4,765,277 | 8/1988 | Bailey et al. | 119/57.9 |
| 5,195,459 | 3/1993 | Ancketill | 119/57.9 |

FOREIGN PATENT DOCUMENTS 370308  4/1932  United Kingdom ............... 119/52.2

Primary Examiner—Gene Mancene
Assistant Examiner—Todd E. Manahan
Attorney, Agent, or Firm—Biebel & French

[57] ABSTRACT

The present invention provides a bird feeder with a height adjustment to allow the bird feeder to be lowered for gaining access thereto. A slide member is attached to the bird seed tray which slides up and down a support for lowering the bird feeder into a lowered position and elevating the bird feeder into an elevated position for dispensing bird seed therefrom. A deflector is provided for directing the bird seed onto the tray for dispensing thereof. A spiral shaped wire is placed upon the feeding portion of the tray in order to prevent the birds from kicking out the bird seed from the tray onto the ground. A protective cover covers the bird feeder to protect the bird seed from the weather.

15 Claims, 5 Drawing Sheets

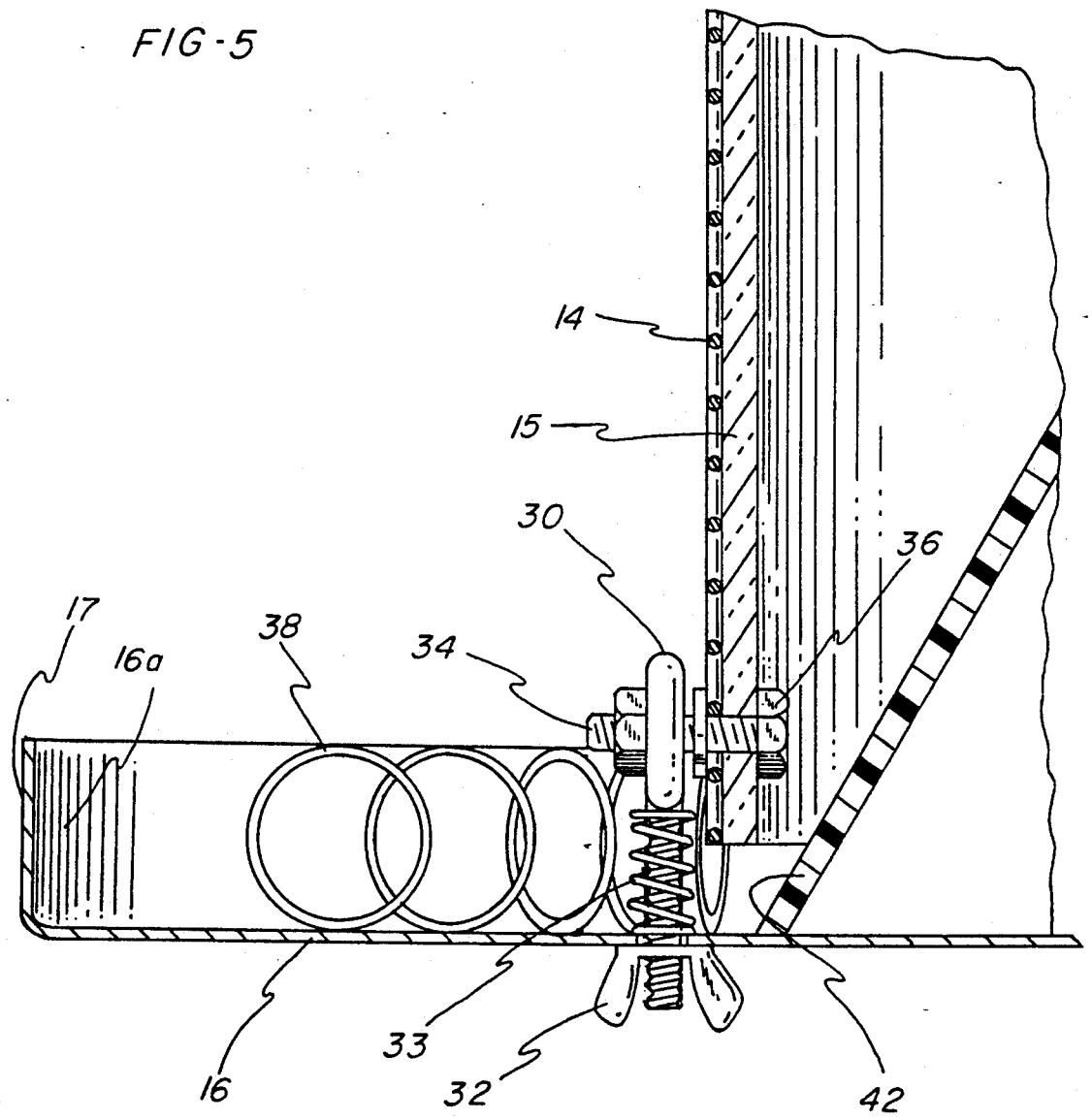

5,289,796

BIRD FEEDER

BACKGROUND OF THE INVENTION

The present invention relates to bird feeders for dispensing bird seed therefrom. More specifically, the present invention relates to a bird feeder which is hung on a tree or supported on a pole and can be lowered for filling or cleaning.

Generally, bird feeders are used to dispense bird seed to the birds common to a particular region. Generally the bird feeders dispense seeds such as, sun flower seeds or a mixture of different types of bird seed.

These bird feeders generally comprise a container which contains the bird seed and a perch such as a stick or tray, and are hung from a tree or are mounted on a pole in an elevated position at eye level. At eye level it is difficult to refill the container of the bird feeder with bird seed. One must use a ladder in order to fill the bird feeder. It is preferred that the container of the bird feeder be at waist level in order to more easily fill the container. Furthermore, due to the general characteristics of birds, one needs readily access to the bird feeder for cleaning.

The past bird feeders do not completely empty all of the bird seed onto the feeding portion of the bird feeder. The bird feeders leave a ring of stale musty often wet or frozen seed after a season of feeding.

Thus, it is desirable to provide a bird feeder which can be readily accessed to refill the feeder with bird seed and can be adjusted dispense different size and types of bird seeds. Furthermore, it is desired to provide a bird feeder wherein all of the bird seed is dispensed onto the feeding portion of the bird feeder preventing any stale build up of bird seed.

SUMMARY OF THE INVENTION

The present invention provides a bird feeder which is maintained in an elevated position and is designed to slide down from the elevated position to a lowered position for filling. The bird feeder of the present invention has a tray with a feeding portion adjacent its circumferential edge to hold the bird seed. The tray is mounted to a slide member. The slide member is preferably in the form of a vertical elongated tube or tube section onto which the tray is mounted. Preferably tray surrounds the slide member.

Positioned on top of the tray is a bird seed cage for holding a quantity of bird seed on top of the tray and for dispensing the bird seed onto the tray. The distance between the cage and the tray, can be adjusted in order to accommodate the dispensing of various sizes of bird seed or for regulating the amount of bird seed dispensed onto the tray.

A support means cooperates with the slide member for elevating and lowering the bird seed tray such that the bird seed cage can be filled. The support means is preferably an elongated tube. A rod cooperates in telescopic relation with the elongated support tube through the slide member for moving the tray from an elevated position to a lowered filling position.

Alternatively, the support means may be a pole anchored to the ground and positioned through the slide member for positioning the bird feeder in the elevated and lowered position.

A latch is used to latch the tray in the elevated position and is movable to an unlatched position for allowing the tray to slide down the pole or elongated support tube and rod into the lowered filling position.

An inverted cone or funnel shaped deflector is placed on the tray and extends upward inside the bird seed cage in order to direct the bird seed from the center of the cage onto the feeding portion of the tray. The upward end of the deflector is mounted along the slide member. The deflector's base is positioned adjacent the tray and leans inward from the circumferential edge of the tray, thereby forcing the bird seed outward and downward towards the feeding portion of the tray. This provides the dispensing of all the bird seed from the bird seed cage before refilling is necessary.

A spiral shaped wire having a diameter which is proportioned to be received in the feeding portion of the tray prevents the birds from perching on the tray and scattering the bird seed out of the tray onto the ground. The spiral also prevents squirrels from feeding from the tray.

A dome shaped cover mounted on the top of the bird seed cage protects the bird seed from the weather, and prevents squirrels from gaining access to the bird seed.

Therefore, it is an object of the present invention to provide a bird feeder which can be lowered to a lower position for filling and cleaning thereof and elevated in an elevated position for dispensing bird seed therefrom. A further object is to provide a bird feeder wherein the bird seed is dispensed therefrom completely before refilling is necessary. Yet another object is to provide a bird feeder which dispenses bird seed and prevents any rodents from feeding from the bird feeder.

BRIEF DESCRIPTION OF THE DRAWINGS

FIG. 5 is a magnified cross-sectional view of the bird seed cage and the tray.

DETAILED DESCRIPTION OF THE PREFERRED EMBODIMENT

Figure 1:
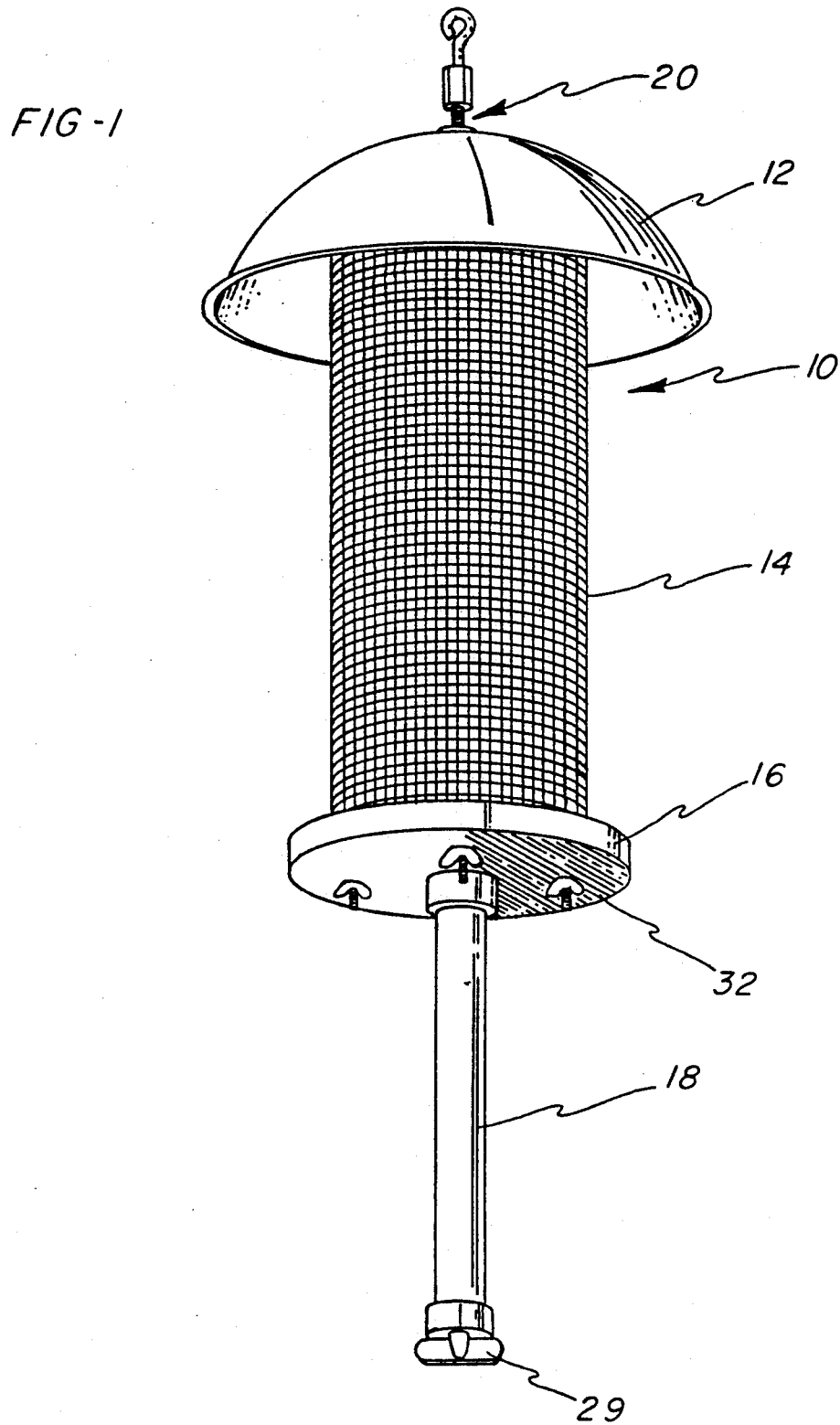
FIG. 1 is a perspective view of the present invention in an elevated position.

Referring to the drawings, there is generally shown the bird feeder 10 of the present invention. A tray 16, preferably circular, is designed to hold the bird seed. The tray 16 is attached to a slide member 18. The slide member 18 allows the bird feeder 10 to slide from an elevated position to a lowered position. A bird seed cage 14 is designed to hold the bird seed and dispenses the bird seed onto the tray 16. A cover 12, is designed to protect the bird feeder from the weather.

Figure 2:
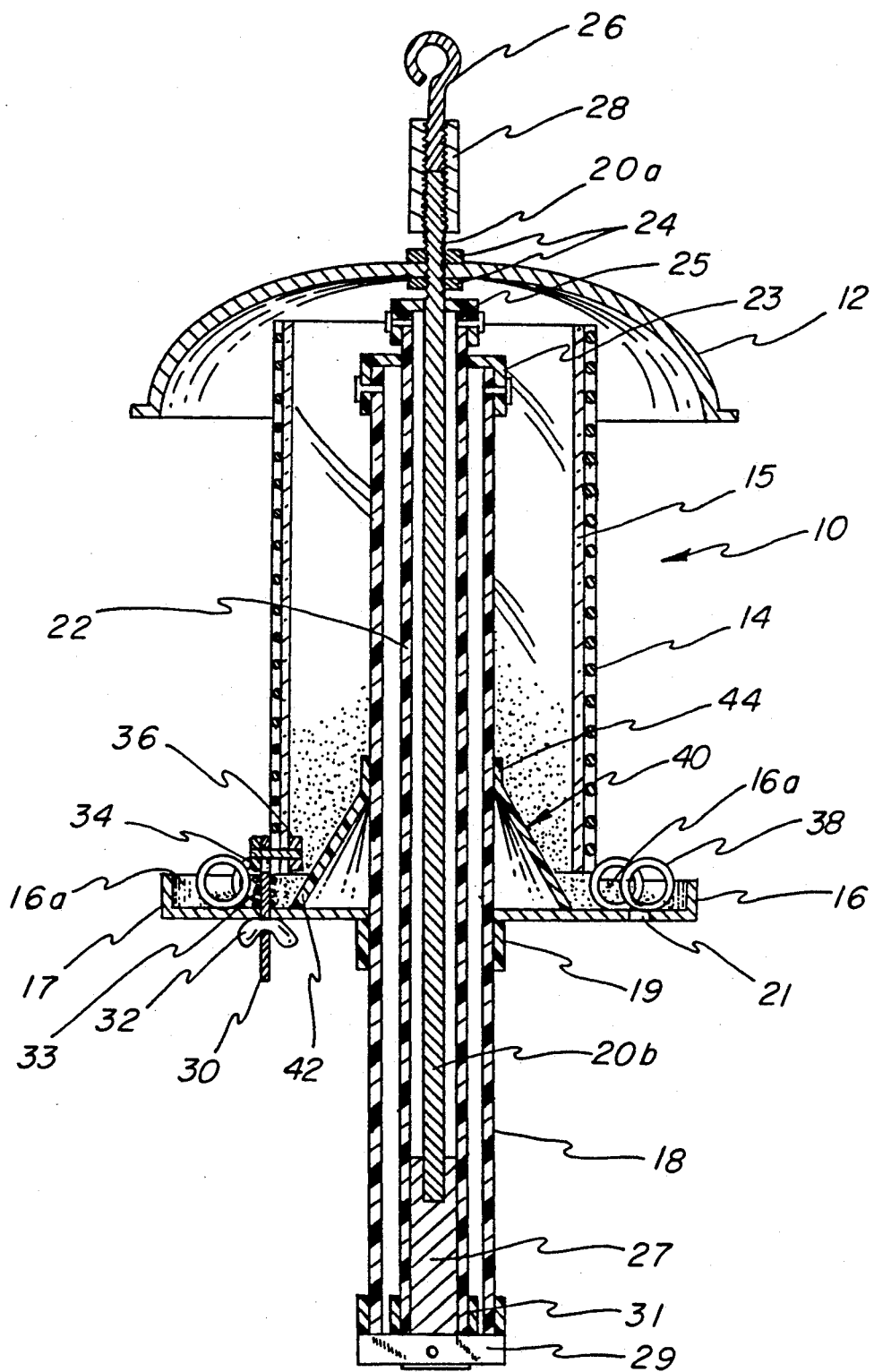
FIG. 2 is a cross-sectional view thereof in the elevated position.

More Specifically, referring to FIG. 1 and 2, the tray 16 is preferably radially flat and has a marginally lip portion 17 which extends radially outward from the cage 14. Drain holes 21 are provided in the tray 16 to allow any water caught in the tray 16 to drain out. The tray 16 is attached to the slide member 18 by gluing, or other means known in the art, and is supported by ring 19. The slide member 18 and tray 16 are supported by a rod 20 and an elongated tube 22. The rod 20 and the elongated tube 22 are coaxial with the slide member 18.

The slide member 18 is preferably a tube made out of PVC. Attached to the top end of the slide member 18 is a top cap 23. A hole in the center of the top cap 23 allows the elongated tube 22 to slide through the top cap 23 of the slide member 18.

The elongated tube 22 is preferably a tube made out of PVC having an outer diameter less than the inner diameter of the slide member 18 thereby allowing the elongated tube 22 to slide in telescopic relation inside the slide member 18. The elongated tube 22 is slightly longer than the slide member 18 so that the elongated tube will extend above the slide member 18.

On the top end of the elongated tube 22 is a cap 25 having a center hole for allowing the rod 20 to slide therethrough in telescopic relation. It should be understood that any means of attaching the cap 25 to tube 22 can be used that will not impede the sliding of the rod 20 through elongated tube 22. Mounted on the bottom of the elongated tube 22 is a bushing 31 for maintaining the elongated tube 22 in coaxial relationship with the slide member 18.

The rod 20 is preferably made of fiberglass or steel. The top end of the rod 20a is threaded for attachment of an eye bolt 26 for hanging the bird feeder 10. The eye bolt 26 is attached to the rod by a coupling nut or turnbuckle 28. The bottom end of the rod 20b has a latch member 27 with a latch 29 attached to the rod 20. The cap 25 of the elongated tube 22 along with the latch member 27 maintains the rod 20 in coaxial relationship with the elongated tube 22.

The latch member 27 and latch 29 maintains the bird feeder 10 in the elevated position. The latch 29 has a center which is rotatably mounted onto the latch member 27. The latch 29 is preferably flat and has a length slightly greater than the outer diameter of the slide member 18 thereby maintaining the latch 29 in abutment with the bottom ends of the slide member 18 and elongated tube 22.

The cage 14 preferably has a cylindrical shape having a diameter less than the tray 16 and is preferably made of wire screen, or plastic. Preferably the cage is constructed from wire screen. The wire screen allows the birds to perch on the cage 14 itself and pull the seed through the cage 14. The type of wire screen used for the cage 14 depends upon the species of bird that will be feeding from the bird feeder 10 and the size of the bird seed used in the bird feeder 10. For example, ⅛ inch wire screen is used for dispensing thistle and ¼ inch wire screen is used for dispensing sunflower seeds. If the bird seed dispensed from the bird feeder 10 is a mixture of different kinds of bird seeds having different sizes, then a liner 15, preferably made of transparent or translucent plastic, should be used in order to facilitate the holding of the bird seed in the cage 14. The transparent liner allows one to see the level of bird seed inside the cage 14.

Specifically referring to FIG. 5, the cage 14 has a bottom edge vertically spaced from the top surface of the tray 16 so that seed can flow out from under the cage 14 onto the feeding portion 16a of the tray 16. The cage 14 is adjustably attached to the tray 16 by eye bolts 30 and wing nuts 32. The eye of the eye bolt 30 is attached to the cage by a securing bolt 34 and nut 36.

In order to adjust the distance between the cage 14 and the tray 16, for dispensing larger seeds, such as sunflower seeds, or for regulating the flow of the seeds from the cage 14 onto the tray 16, the wing nut 32 is turned clockwise to increase the distance between the cage 14 and the tray 16 or clockwise to decrease the distance between the cage 14 and the tray 16. A spring 33 positioned around the eye bolt 30 abuts the top surface of the tray 16 and forces the cage 14 upward, thereby preventing the cage 14 from resting on the tray 16.

It should be understood that any other type of means can be used to raise and lower the cage 14 for regulating the dispensing of the seed from the cage 14 onto the tray's feeding portion 16a.

A wire spiral 38 having a diameter proportional to be received in the feeding portion of the tray 16a, is positioned on the tray 16. The spiral 38 prevents the birds from scattering the bird seed out of the tray onto the ground and prevents squirrels from gaining access to the bird seed.

The ability to adjust the distance between the cage 14 and the tray 16, for permitting different size bird seed to pass therethrough, allows the present invention to dispense a plurality of different kinds of bird seed such as, sunflower seeds, wild seeds, cracked corn, or niger in an appropriate amount onto the tray 16.

The deflector 40 is an inverted funnel or cone which is positioned in the center of the cage 14 with its base 42 positioned and secured adjacent the tray 16 and its apex 44 positioned around the slide member 18. The base of the deflector 40 has a smaller diameter than the cage 14 to allow the bird seed to flow under the cage 14 onto the feeding portion 16a of the tray 16. The deflector 40 leans inward from the circumferential edge of the tray 16 at an angle greater than the natural angle of repose thereby directing the bird seed from the center of the cage 14 towards the circumferential edge of the tray onto the feeding portion 16a of the tray 16. This design prevents the bird seed from becoming wet and frozen into a cake of musty bird seed in the center of the cage 14.

Again referring to FIGS. 1 and 2, a dome shaped cover 12, having a larger diameter than the tray 16, is attached to the top portion of the rod 20a by two nuts 24 for protecting the bird seed from the weather and also preventing squirrels from gaining access to the bird seed. If a squirrel attempts to climb down the dome 12 the squirrel will slide off dome 12.

Figure 3:
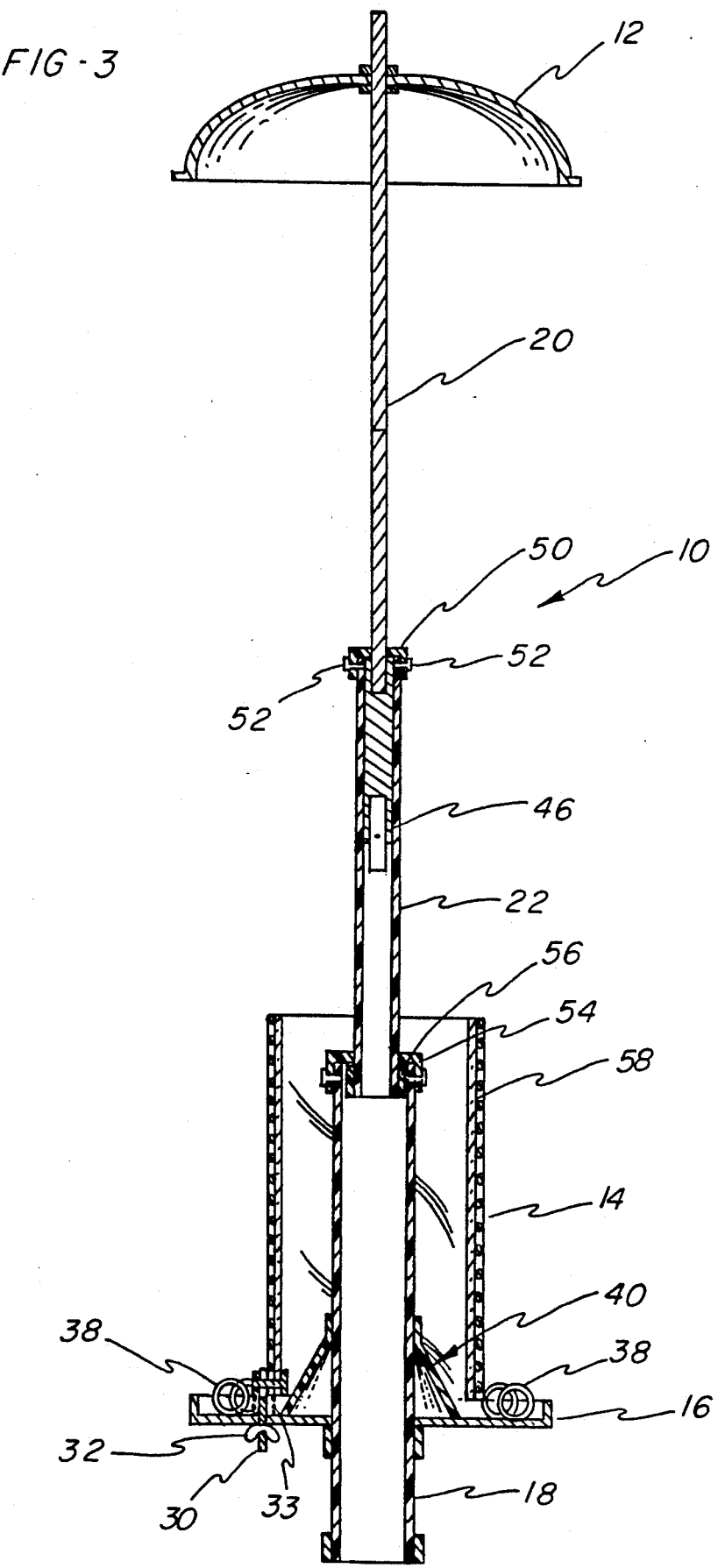
FIG. 3 is a cross-sectional view thereof in the lowered position.

Referring to FIGS. 2 and 3, the bird feeder 10 of the present invention is shown in the elevated position in FIG. 2 and in the lowered position in FIG. 3. The bird feeder 10 is maintained in the elevated position by a latch 29 which in the horizontal position is in abutting relation to the bottom edge of both the elongated tube 22 and the slide member 18.

In order to lower the bird feeder 10 into the lowered position, the latch 29, which is rotatably mounted to latch member 27, is rotated 90° from a horizontal position as shown in FIG. 2 to a vertical position as shown in FIG. 3. The latch 29 and latch member 27 have a width which is slightly less than the inner diameter of the elongated tube 22, thereby allowing the elongated tube 22 to slide down the rod 20 when the latch 29 is in the vertical position.

The elongated tube 22 is slid down rod 20 until the top of the latch member 27 abuts against the top cap 25 of the elongated tube 22. Furthermore, the slide member 18 slides down the elongated tube 22 thereby lowering the cage 14 and tray 16 to the lowered position. In the lowered position the slide member's top cap 23 abuts against the bushing 31 of the elongated tube 22. The caps 23, 25, bushing 31 and latch member 27 allows the bird feeder 10 to be lowered telescopically without the separation of the rod 20, elongated tube 22 and slide member 18.

It should be understood that the length of the rod 20, elongated tube 22, and slide member 18 may be shortened or lengthened in order to change the distance the bird feeder 10 extends when lowered.

Figure 4:
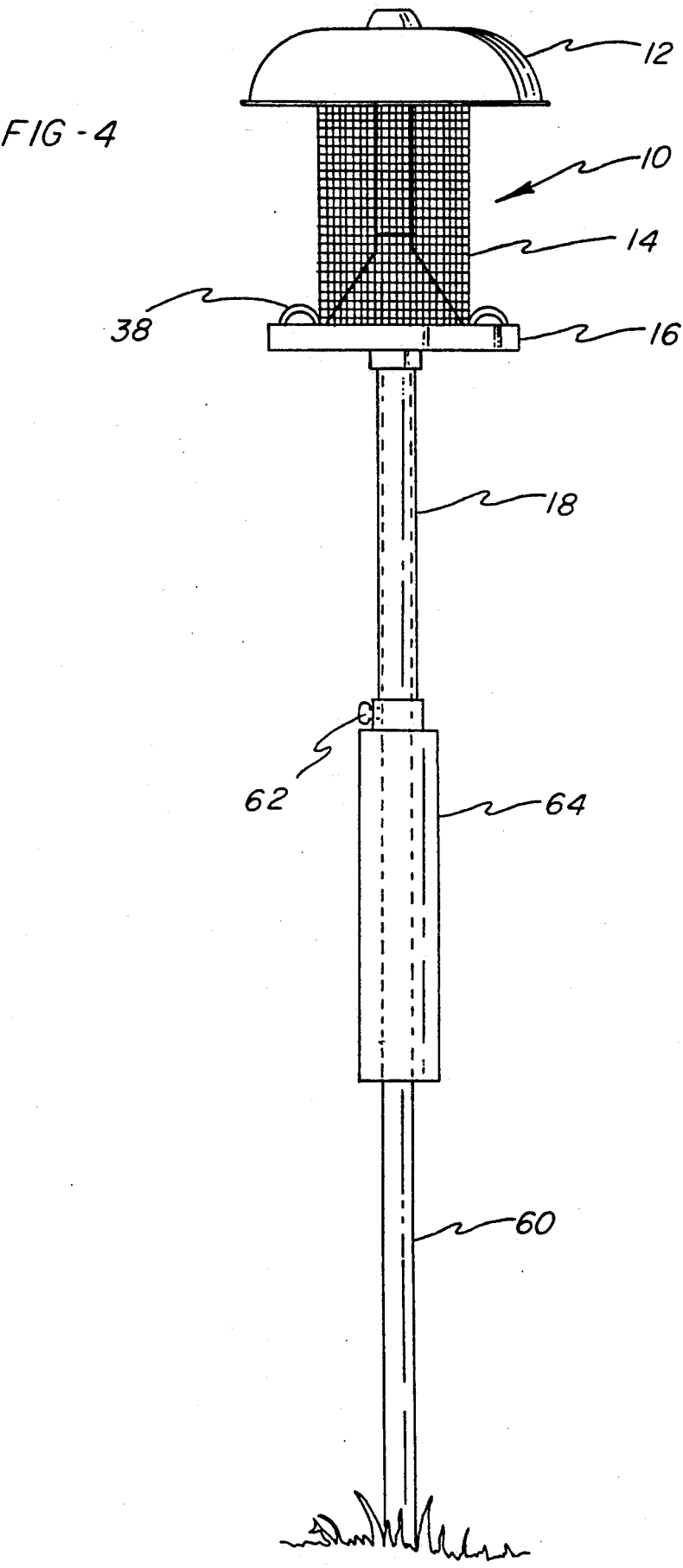
FIG. 4 is an alternative embodiment thereof in the elevated position.

Referring to FIG. 4 there is shown an alternate embodiment wherein a pole 60 is disposed through the slide member 18. It is preferred that the pole 60 is anchored to the ground by usual means such as concrete or simply forced therein. The slide member 18 is positioned vertically on the pole 60 by the securing apparatus 62, such as a thumb screw. The thumb screw 62 is forced against pole 60 in abutting relation to hold the bird feeder 10 in the elevated position.

The bird feeder 10 in FIG. 4 is lowered by unfastening thumb screw 62 thereby allowing the slide member 18 to slide down along the pole 60 into the lowered position. It should be understood that the bird feeder can be adjusted to varying heights based upon the length of the pole 60 and were the thumb screw 62 is secured to the pole 60. Furthermore, the bird feeder 10 can be attached to the pole by other means know in the art other than a thumb screw.

Attached to the slide member 18 is a squirrel guard 64 which prevents any squirrels or mice from climbing up pole 60 and gaining access to the bird seed located in the bird feeder 10. Preferably the squirrel guard 64 is a hollow cylinder opened at the bottom end with the top end attached to the slide member 18.

While the form of apparatus herein described constitutes a preferred embodiment of this invention. it is to be understood that the invention is not limited to this precise form of apparatus, and that changes may be made therein without departing from the scope of the invention which is defined in the appended claims.

What is claimed is:

1. A bird feeder comprising;
   a tray having a radially flat marginal lip portion extending radially outward defining a feeding portion thereon;
   feeding means adjustably attached to said tray for holding and supplying bird seed onto said tray, said feeding means being adjustable with respect to said tray to hold different kinds of bird seed having various sizes for dispensing an appropriate amount of bird seed onto said feeding portion of said tray;
   a slide member cooperating with said tray;
   an elongated support member slidably disposed through said slide member, and for maintaining said tray in an elevated position and for sliding said slide member and said tray down along said elongated support member to a lowered position;
   a rod cooperating in telescoping relation with said elongated support member, said rod having a top and bottom ends, said top end of said rod extending through said support member; and
   a latch mounted to the bottom end of said rod for latching said tray in an elevated position, said latch being moveable to an unlatched position for permitting said elongated support member to slide down along said rod and said slide member to slide down along said elongated support member to move said tray to a lowered position.

2. The bird feeder of claim 1 wherein said feeding means comprises a bird seed cage having a bottom edge positioned in spaced relation to said tray for holding bird seed and dispensing bird seed therefrom onto said tray.

3. The bird feeder of claim 2 wherein said bird seed cage is adjustable with respect to said tray by adjusting screws mounted to said bird seed cage and adjustably attached to said tray for adjusting the distance between the bottom edge of said bird seed cage and said tray for accommodating and dispensing various sized bird seeds.

4. The bird feeder of claim 2 further comprising a means for directing the bird seed from the center of said cage towards said feeding portion of said tray.

5. The bird feeder of claim 2 further comprising a means for saving bird seed on said tray being received in the feeding portion of said tray, said means for saving bird seed preventing birds from scattering the bird seed out of said tray onto the ground.

6. The bird feeder of claim 2 further comprising a means for guarding positioned below said tray for preventing squirrels from feeding from the bird feeder.

7. The bird feeder of claim 2 further comprising a means for protecting said bird seed positioned above said bird seed cage for protecting said bird seed in said cage from the weather and squirrels.

8. A bird feeder, for containing and dispensing bird seed, comprising;
   a bird seed tray having a radial flat marginal lip portion extending radially outward from a center thereby defining a feeding portion thereon;
   a slide member attached to said bird seed tray, concentric therewith, said slide member having a top and a bottom end;
   a cage extending upward from said bird seed tray, said cage having a bottom edge positioned in spaced relation to said bird seed tray for allowing the bird seed in said cage to pass between the bottom edge of said cage and said bird seed tray to said feeding portion of said bird seed tray;
   an elongated tube having a predetermined length and top and bottom ends, said top end of said elongated tube disposed through said slide member;
   a rod cooperating in telescoping relation in said elongated tube, said rod having a top end and a bottom end and being greater in length than said elongated tube;
   a hanging means attached to said top end of said rod for hanging said bird feeder; and
   a latch attached to said bottom end of said rod for latching said tray in an elevated position, said latch being moveable to an unlatched position for permitting said elongated tube to slide down along said rod and said slide member to slide down along said elongated tube to move said tray to a lowered position.

9. The bird feeder of claim 8 further comprising a dome shaped cover positioned over said cage for protecting said bird seed from the weather and preventing squirrels from access to the bird seed.

10. The bird feeder of claim 8 further comprising a means for adjusting the distance between the bottom edge of said cage and said tray for accommodating various sized bird seeds dispensed therebetween.

11. The bird feeder of claim 8 further comprising a bird seed cage liner positioned adjacent said cage for facilitating said cage in holding the bird seed.

12. The bird feeder of claim 8 further comprising a deflector for directing the bird seed from the center of said cage towards said feeding portion of tray.

13. The bird feeder of claim 8 further comprising a spiral shaped wire having a diameter which is proportioned to be received in the feeding portion of said tray, said wire preventing birds from scattering the seed out of the tray onto the ground and squirrels from gaining access to the bird seed located in the feeding portion of said tray.

14. A bird feeder, comprising;
a bird seed tray having a radially flat marginal lip portion extending radially form its center defining a feeding portion;
a slide member having a top and bottom ends, said slide member being concentric with and extending through said bird seed tray;
a bird seed cage extending upward from said bird seed tray, said bird seed cage having a bottom edge in spaced relation with said bird seed tray;
an elongated tube having a top and bottom ends and a predetermined length, said elongated tube disposed in sliding relation in said slide member;
a rod having a length greater than said elongated tube cooperating in telescoping relation with said elongated tube, said rod having a top and a bottom end;
a hanging means attached to said top end of said rod for hanging thereof;
a latch attached to said rod for latching said elongated tube and said rod for maintaining said tray in an elevated position, said latch being moveable to an unlatched position for permitting said elongated tube to slide down along said rod and said slide member to slide down along said elongated tube to move said tray to a lowered position;

a dome shaped cover attached to said top end of said rod positioned over said cage for protecting said bird seed and preventing squirrels from access to the bird seed;
a deflector positioned in the center of said tray for directing the bird seed towards the feeding portion of said tray for dispensing the bird seed to said feeding portion and preventing bird seed from caking in the center of said cage on top of said tray.

15. A bird feeder comprising:
a tray having a radially flat marginal lip portion extending radially outward defining a feeding portion thereon;
a bird seed cage having a bottom edge positioned in spaced relationship to said tray for holding bird seed and for dispensing bird seed therefrom onto said tray feeding portion;
a plurality of adjusting screws each having an upper end connected to said bird seed cage and having a lower end extending through said tray;
spring means positioned on said adjusting screws between said tray and said bottom edge of said bird cage;
wing nuts mounted on said adjusting screw lower ends for adjusting the position of said tray relative to said bird cage bottom edge for adjusting the space between said cage and said tray to accommodate and dispense bird seeds of differing sizes.

* * * * *